United States Patent [19]

Inao et al.

[11] Patent Number: 5,259,858
[45] Date of Patent: Nov. 9, 1993

[54] METHOD AND APPARATUS FOR FORMING A MOUTH IN A GLASS CONTAINER

[75] Inventors: Takaaki Inao; Masanori Hayashi; Youichi Kimura, all of Shiga, Japan

[73] Assignee: Nippon Electric Glass Co., Ltd., Shiga, Japan

[21] Appl. No.: 812,480

[22] Filed: Dec. 23, 1991

[30] Foreign Application Priority Data

Dec. 26, 1990 [JP] Japan ............................ 2-404967[U]
Sep. 12, 1991 [JP] Japan ................................. 3-232676

[51] Int. Cl.⁵ ............................................. C03B 23/00
[52] U.S. Cl. ..................................... 65/102; 65/108; 65/282; 65/299
[58] Field of Search ................... 65/102, 108, 64, 281, 65/282, 292, 299, 275

[56] References Cited

U.S. PATENT DOCUMENTS

| | | | |
|---|---|---|---|
| 214,054 | 4/1879 | Ripley | 65/299 |
| 1,528,534 | 3/1925 | DeRitis | 65/292 |
| 2,266,417 | 12/1941 | Eisler | 65/299 |
| 2,475,915 | 7/1949 | Orr | 65/299 |
| 2,596,899 | 5/1952 | Kahle | 65/282 |
| 3,202,495 | 8/1965 | Zauner | 65/282 |
| 3,203,779 | 8/1965 | Reber | 65/299 |
| 3,293,018 | 12/1966 | Doty | 65/282 |

Primary Examiner—W. Gary Jones
Assistant Examiner—Steven P. Griffin
Attorney, Agent, or Firm—Nikaido, Marmelstein, Murray & Oram

[57] ABSTRACT

Satisfactory molding of a spout in the upper inclined opening edge of a glass container is effected by heating the spout molded portion of the upper opening edge to soften it, premolding the heated softened portion by raising it from the inside of the glass container by the premolding member of a spout premolding device, and finish-molding it by a spout molding device. The spout molding device supports the molding device above a glass container setting position for vertical and horizontal movements, and outwardly substantially horizontally moves this molding member, which is put in the glass container, so as to outwardly push and deform the upper opening edge of the glass container in such a manner as to mold a spout. The path of movement of the molding member is controlled by a fixed cam to finish the spout into a desired shape.

3 Claims, 9 Drawing Sheets

METHOD AND APPARATUS FOR FORMING A MOUTH IN A GLASS CONTAINER

BACKGROUND OF THE INVENTION

1. Field of the Invention

The present invention relates to a method and apparatus for fitting a mouth to a glass container, such as a beaker or teapot, that is, for molding a spout in the opening edge of a glass container.

2. Prior Art

The operation of molding the spout of a blow-molded glass container, such as a beaker, is effected by locally heating the upper opening edge of the glass container to soften it and pushing out the softened portion from the inside to the outside.

A conventional spout molding apparatus is arranged as shown in FIG. 8. The reference numeral 81 denotes a horizontally disposed, vertically movable lifting plate. A first air cylinder 82 for vertically moving the lifting plate 81 is suspended at a fixed position above the lifting plate 81, having a rod 83 fixed at its lower end to the lifting plate 81. The rod 85 of a second air cylinder 84 disposed on the upper surface of the lifting plate 81 extends downward through the lifting plate 81. The numeral 86 denotes a fixed link suspended from the lower surface of the lifting plate in parallel relation to the rod 85 of the second air cylinder 84, and 87 denotes a press link pivotally connected to the front end of the rod 85 of the second air cylinder 84 through a pivot shaft 88. The opposite ends of a connecting link 89 upwardly inclined toward the press link 87 are pivotally connected to the lower ends of the fixed link 86 and press link 87 through pivot shafts 90 and 91, respectively. A molding member 4 of inverted L-shaped cross section fixed to the lower surface of the connecting link 89 is adapted to push open that portion 1b of the upper opening edge 1a of a glass container 1 positioned on a stage 2 which is softened by being heated by a burner 3. That is, the rod 83 of the first air cylinder 82 is projected to lower the lifting plate 81 to position the downwardly inclined end 89a of the connecting link 89 at the upper surface opening 1d of the glass container 1. Subsequently, the rod 85 of the second air cylinder 84 is projected, whereby the press link 87 is turned outward around the axis of the pivot shaft 88, depressing the upwardly inclined end 89b of the connecting link 89. Thereupon, the connecting link 89 is turned downward around the axis of the pivot shaft 90, causing the molding member 4 to depress the softened portion 1b of the upper opening edge 1a of the glass container 1 so as to open it outward, so that as shown in phantom lines, a spout 1c having a forming angle θ is formed in the upper opening edge 1a of the glass container 1 (see FIG. 7C).

If the forming angle θ of the spout 1c of the glass container 1 is an obtuse angle, the drip-free quality of the spout 1c is poor; thus, in order to improve the drip-free quality, it is necessary that the forming angle θ of the spout 1c of the glass container 1 be a right angle (FIG. 7B) or an acute angle (FIG. 7A) smaller than that. However, according to a conventional spout molding apparatus, when a spout is to be molded, the softened portion 1b of the upper opening edge 1a of the glass container 1 is pressed from above by the molding member 4. Therefore, in the case of a right angle or an acute angle smaller than that, the deformation toward the outside is not smoothly effected, resulting in acquiring wrinkles on the molded surface of the spout 1c. This formation of wrinkles increases as the forming angle θ is made more acute in an effort to improve the drip-free quality. Thus, with the conventional spout molding apparatus it has been difficult to form a spout 1c whose forming angle is acute.

Further, since the length of the connecting link 89 and the stroke of the second air cylinder 84 in the conventional spout molding apparatus are constant, the forming angle θ of the spout 1c of the glass container 1 cannot be changed. Thus, in the case of molding spouts having different forming angles, spout molding devices corresponding to the different forming angles have to be provided, leading to increased cost and to increased time and labor involved in the exchange of devices, detracting from operability.

Further, since it is required that the spout have satisfactory drip-free quality and be prevented from acquiring wrinkles, as described above, care is taken in molding so that the shape is stabilized so as not to acquire wrinkles on the molded surface, but in some types of glass containers there are cases where it is difficult to mold a satisfactory spout. For example, as shown in FIGS. 9A and 9B, one case is of a glass container in the form of a bottomed cylindrical body having an inwardly inclined opening edge 1a in the upper region. FIG. 9A is a side view, partly broken away, of a glass container being locally heated, and FIG. 9B is a side view, partly broken away, of the glass container whose spout is being molded. The glass container 1 is positioned on a horizontal stage 2 and the spout molding scheduled portion of the opening edge 1a is locally heated by a burner 3 to soften said portion, and then the softened portion 1b of the opening edge 1a is pressed outward by a plate-like molding member 4 shown in phantom lines in FIG. 9B, thereby molding a spout 1c. The glass container 1 is intermittently transferred to positions including the heating position and the molding position as by a turntable. In the heating position, the opening edge 1a is heated and in the spout molding position, the locally heated softened portion 1b of the opening edge 1a is molded to form a spout. However, during the time that the glass container 1 is transferred from the heating position to the spout molding position, the locally heated softened portion 1b of the inclined opening edge 1a tends to sag under its own weight. The thus sagging softened portion 1b cannot be properly treated by the molding member 4, with the result that the molded spout 1c is disfigured and in the worst case it becomes impossible to mold the spout 1c. For this reason, it has been common practice in some cases to perform the local heating while holding the glass container 1 horizontal or oblique so as to prevent the softened portion 1b to be locally heated from sagging. However, in this case, the mechanism for transferring the glass container 1 while holding it horizontal or oblique becomes complicated, leading to an increase in the manufacturing equipment cost.

SUMMARY OF THE INVENTION

The method of forming a mouth on a glass container according to the present invention is a method of molding a spout in the inwardly inclined upper opening edge of a glass container, said method comprising the steps of heating the portion of the upper opening edge which is to be molded into a spout to soften it, premolding said heated softened portion by raising it from the inside of the glass container, and finish-molding the spout.

The apparatus for forming a mouth on a glass container according to the present invention is an apparatus for molding a spout in the inwardly inclined upper opening edge of a glass container, said apparatus comprising means for heating the portion of the upper opening edge which is to be molded into a spout to soften it, a premolding device for premolding said heated softened portion by raising it from the inside of the glass container, and a spout molding device for finish-molding the premolded portion to mold a spout.

According to the present invention, since the portion of the opening edge of the glass container which is to be molded into a spout is heated to be softened and the heated softened portion is raised from the inside of the glass container, there is no possibility of the softened portion sagging during the finish-molding of the spout, making it possible to satisfactorily form a spout in the inclined opening edge of the glass container; thus, an increase in the yield of glass container production and improved quality can be attained.

The apparatus for molding the spout of a glass container according to the present invention comprises a molding member supported on a support frame above a glass container setting position so that it is vertically and horizontally movable, an actuating cylinder for advancing and retracting said molding member substantially horizontally, and a fixed cam for vertically guiding or controlling said molding member during movement by the actuating cylinder. When the molding member is inserted into the upper opening in the glass container placed in the glass container setting position and is moved substantially horizontally by the actuating cylinder, it describes substantially the same path as the shape of the cam surface, substantially horizontally pressing the upper opening edge of the glass container from the inside to the outside, thereby forming a spout of the same cross sectional shape as the cam surface.

According to the present invention, since the softened portion of the upper opening edge of the glass container is pressed radially outward from the inside by a molding roller moving substantially horizontally, there is no possibility of forming wrinkles on the molded surface; thus, a spout having an acute forming angle can be reliably and smoothly produced. Furthermore, since the path of movement of the molding roller is determined by the shape of the cam surface of the fixed cam, the path of movement of the molding roller can be changed by changing the shape of the cam surface. Therefore, a spout of any desired shape can be molded in a glass container simply by exchanging the fixed cam.

DESCRIPTION OF THE PREFERRED EMBODIMENTS

Figure 9A:
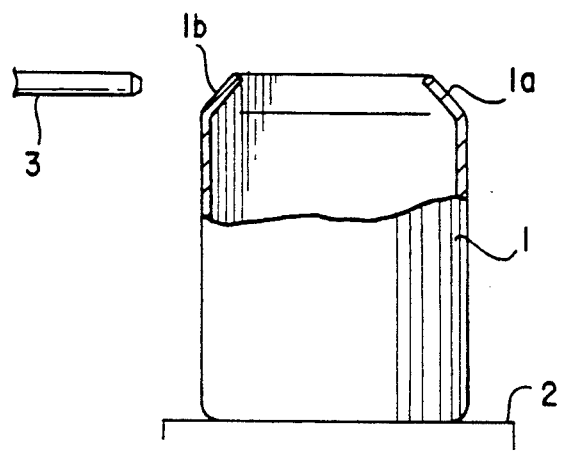
FIGS. 9A and 9B are side views, partly broken away, of a glass container.
Figure 9B:
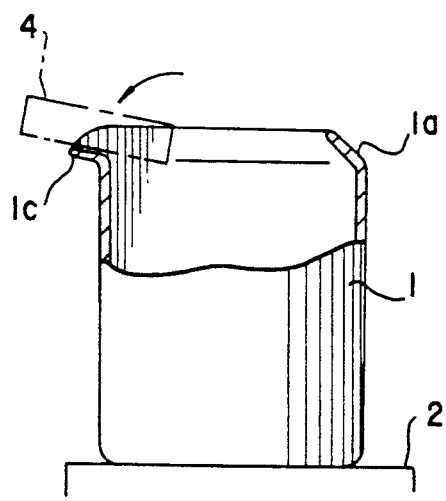

A concrete example of the present invention will now be described with reference to a mouth fitting operation applied to the previously described glass container 1 shown in FIGS. 9A and 9B.

Figure 1:
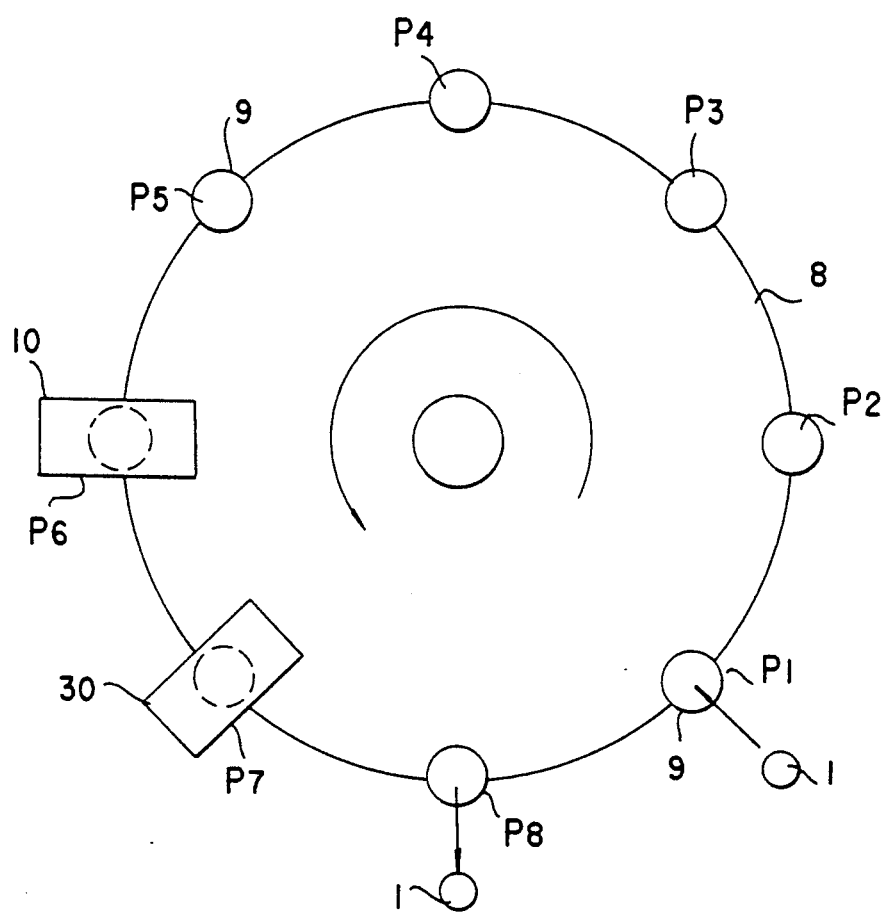
FIG. 1 is a plan view diagrammatically showing the outline of a mouth fitting apparatus according to the present invention.
Figure 2:
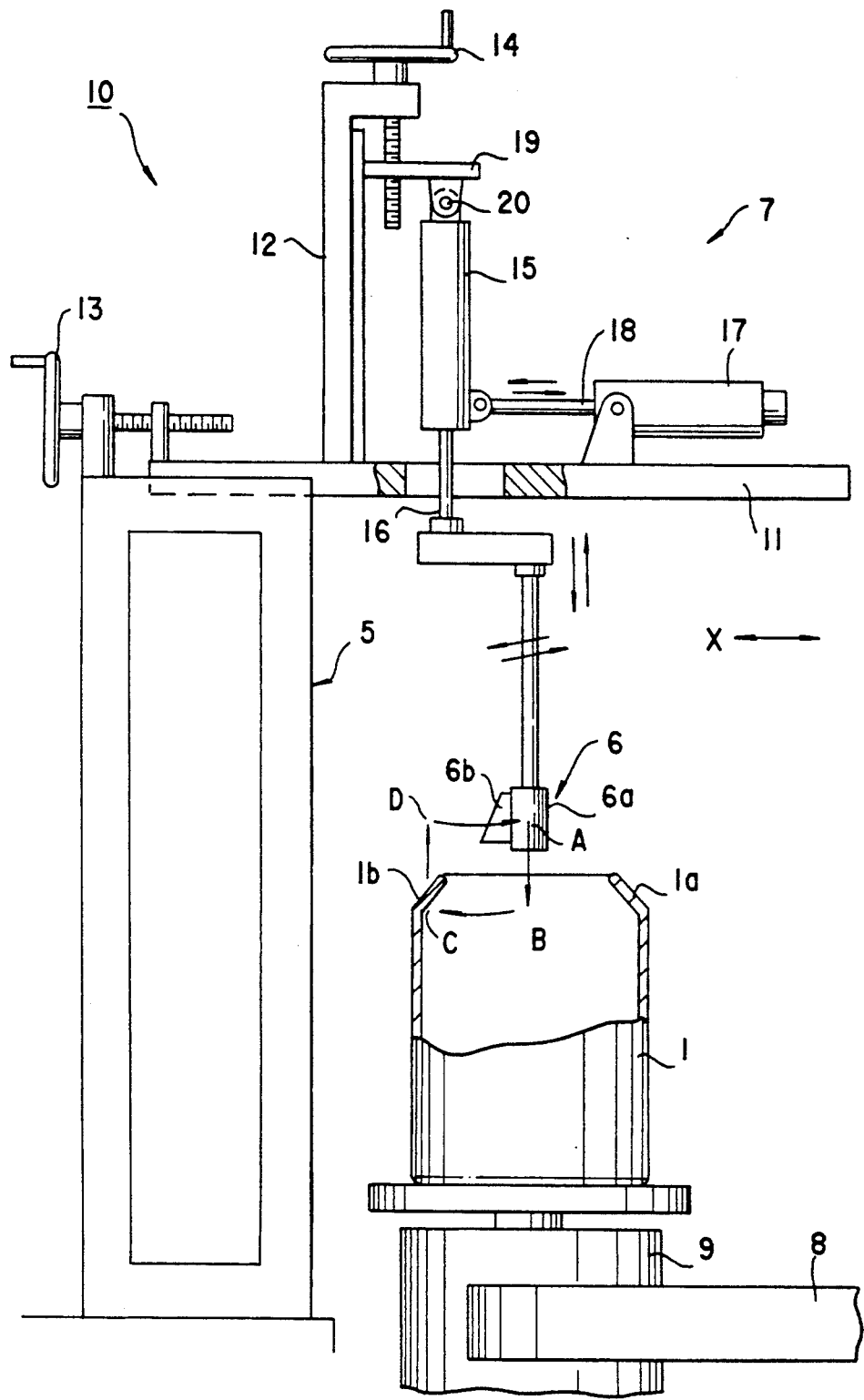
FIG. 2 is an elevational view, partly broken away, of a premolding device in the mouth fitting apparatus of FIG. 1.
Figure 3A:
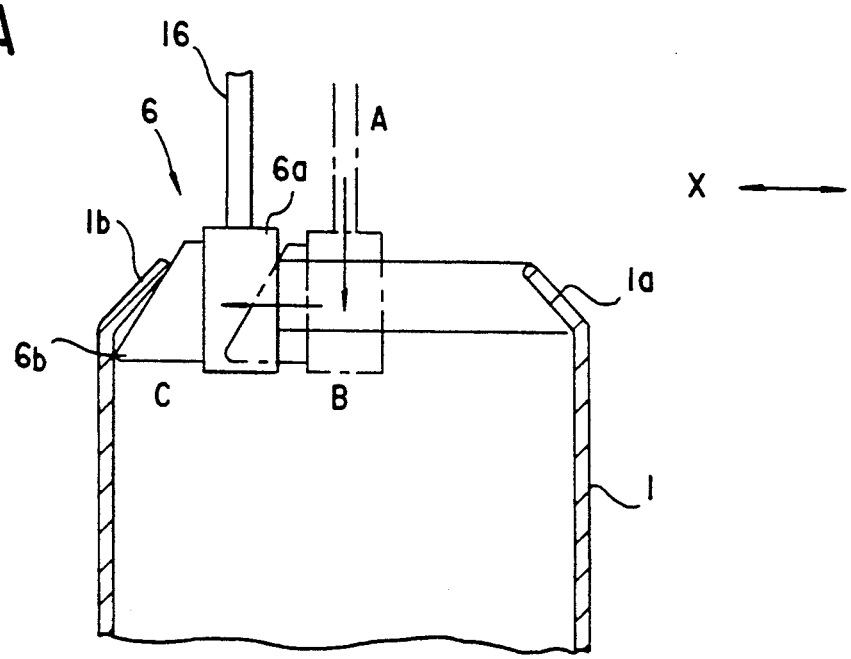
FIGS. 3A and 3B are fragmentary enlarged views of the device of FIG. 2, showing the states before and after premolding, respectively.
Figure 3B:
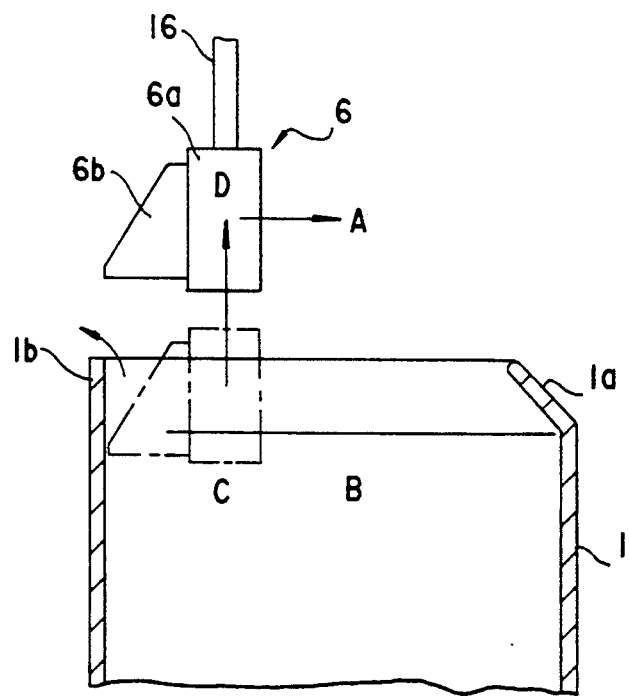

First, the premolding of a spout will be described with reference to FIGS. 2, 3A and 3B. A spout premolding device 10 shown in FIG. 2 is installed at a place around a mouth fitting turntable 8 in FIG. 1. The turntable 8, as shown in FIG. 1, has eight heads 9 equispaced around the periphery thereof. Each head 9 is conveyed successively to the first through eighth positions $P_1$ through $P_8$. When a head 9 reaches the first station, a glass container 1 is fed onto the head 9. During the time that the glass container 1 is passed to the positions $P_2$–$P_5$, the local heating (see FIG. 9A) of the opening edge 1a of the glass container 1 is gradually performed. The spout premolding device 10 is installed at the sixth position $P_6$, and a spout molding device 30 to be later described is installed at the seventh position $P_7$. The eighth position $P_8$ is an unloading position where the glass container 1 having undergone the mouth fitting operation is removed from the turntable.

The spout premolding device 10, as shown in FIG. 2, comprises a support frame 5 erected at the sixth position $P_6$ of the turntable 8, a driving mechanism 7 mounted on the support frame 5, and a premolding member 6 movably supported on the driving mechanism 7. A horizontal support plate 11 is mounted on the support frame 5 so that it is slidable radially of the turntable 8, that is, in the direction of arrow X, the movement of said support plate 11 being effected by manually operating a handle 13. A vertical support plate 12 is mounted on the horizontal support plate 11, and attached to the upper portion thereof is a lifting plate 19 adapted to be vertically moved by manually operating a handle 14. The driving mechanism 7 comprises a vertical cylinder 15 for vertically moving the premolding member 6, and a horizontal cylinder 17 for moving the premolding member 6 back and forth in the X direction. The upper end of the vertical cylinder 15 is rotatably connected to the lifting plate 19 by a pivot shaft 20, so that the vertical cylinder 15 is capable of swing movement in a vertical plane. The premolding member 6 is fixed to the lower end of a rod 16 extending downward from the vertical cylinder 15. The horizontal cylinder 17 is supported on the horizontal support plate 11, and the front end of a rod 18 extending in the X direction is connected to the lower end of the vertical cylinder 15. When the rod 18 is advanced and retracted, the vertical cylinder 15 swings around the axis of the pivot shaft 20, thereby moving the premolding member 6 back and forth in an arcuate path. The premolding member 6 is in the form of, for example, a circular pillar 6a having a substantially triangular premolding plate 6b projecting from the lateral surface thereof radially outward of the turntable 8 and it is moved successively through the positions A, B, C and D shown by arrows in FIG. 2 by the driving mechanism 7, thereby premolding the opening edge 1a of the glass container 1 carried in at the sixth position $P_6$. In addition, the locally heated softened portion 1b of the opening edge 1a of the glass container 1 is directed radially outward of the turntable 8.

The spout premolding operation on the glass container by the spout premolding device 10 will now be described. As shown in FIG. 2, when the premolding member 6 is in the standby position A, the locally heated glass container 1 is carried in immediately therebelow. Thereupon, the vertical cylinder 15 is actuated to lower the rod 16, lowering the premolding member 6 to the position B shown in phantom line in FIG. 3A. Then, the horizontal cylinder 17 is actuated to advance the rod 18, advancing the vertical cylinder 15 in swing movement in the X direction to the advance position C shown in solid lines in FIG. 3A. In this advance position C, the premolding plate 6b contacts or approaches the locally heated softened portion 1b of the opening edge 1a of the glass container 1. At this time, the premolding plate 6b of the premolding member 6 approaches the inside of the softened portion 1b as it is somewhat making an upward arcuate movement; therefore, even if the inclined softened portion 1b slightly sags, the premolding plate 6b smoothly moves into the softened portion 1b so as to correct the sag. Then, the rod 16 of the vertical cylinder 15 is retracted to lift the premolding member 6 from the advance position C to the position D immediately thereabove, as shown in FIG. 3B. During this upward movement, the front end of the premolding plate 6b raises the softened portion 1b of the glass container 1 to premold the softened portion 1b substantially in the same plane as that of the lateral wall of the glass container 1. Upon completion of the premolding, the premolding member 6 is returned to the original standby position A from the position D by the retraction of the rod 18 of the horizontal cylinder 17. In this manner, the spout molded portion of the opening edge of the glass container is heated and softened and this heated softened portion is premolded by raising it from the inside of the glass container, whereby the heated softened portion is prevented from sagging prior to the spout molding operation; thus, the spout molding operation is satisfactorily performed.

Figure 4A:
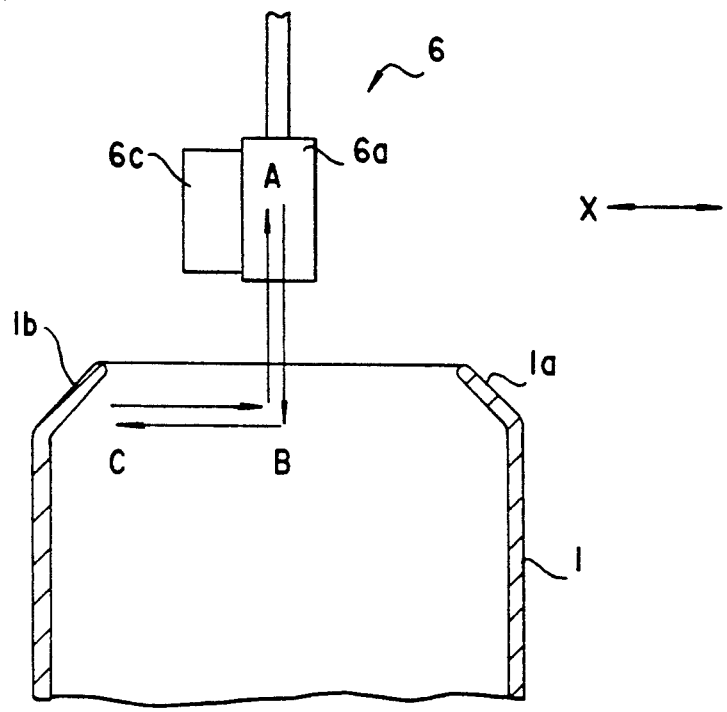
FIGS. 4A and 4B are views similar to FIGS. 3A and 3B, showing a modified example of the premolding member.
Figure 4B:
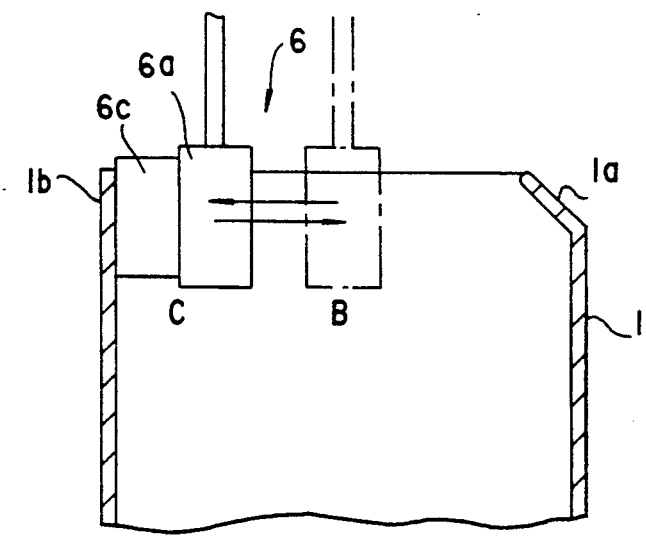

FIGS. 4A and 4B show a modified example of a premolding member 6 having a rectangular premolding plate 6b projecting from the lateral surface thereof. In this case, the premolding member 6 is lowered from the standby position A in the order of B-C-B-A, performing downward, forward, backward and upward movements. That is, it is lowered from the standby position A to the position B in FIG. 4A, and advanced to the forward position C shown in FIG. 4B, whereupon the vertical front end surface 6c of the premolding plate 6b raises the softened portion 1b of the opening edge 1a of the glass container 1 from the inside, premolding the softened portion 1b to cause it to extend along the lateral wall of the glass container 1. The premolding member 6 having performed premolding is retracted from the forward position C to the position B, and moved upward to the standby position A. Such movement of the premolding member 6 can be easily realized simply by changing the order of actuation of the cylinders 15 and 17 shown in FIG. 2.

In addition, in the spout premolding device 10 in FIG. 2, in the case where the glass container 1 is changed to one having a different height or bore diameter, this situation can be coped with by manually operating the handles 13 and 14 of the support frame 5 to adjust the standby position A for the premolding member 6 to the new glass container.

Figure 5A:
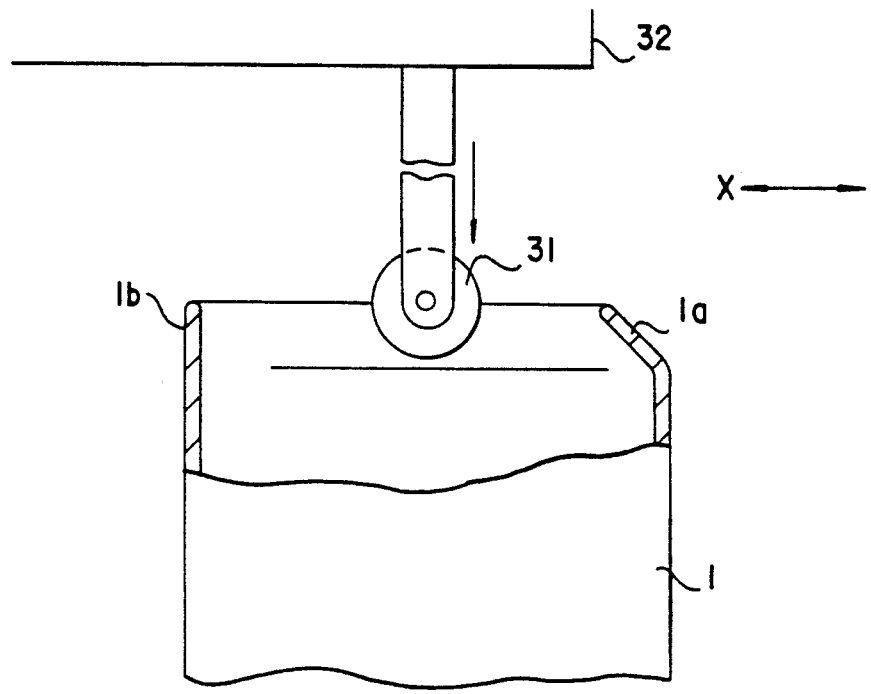
FIGS. 5A and 5B are schematic side views of a spout molding device in a mouth fitting apparatus according to the present invention.
Figure 5B:
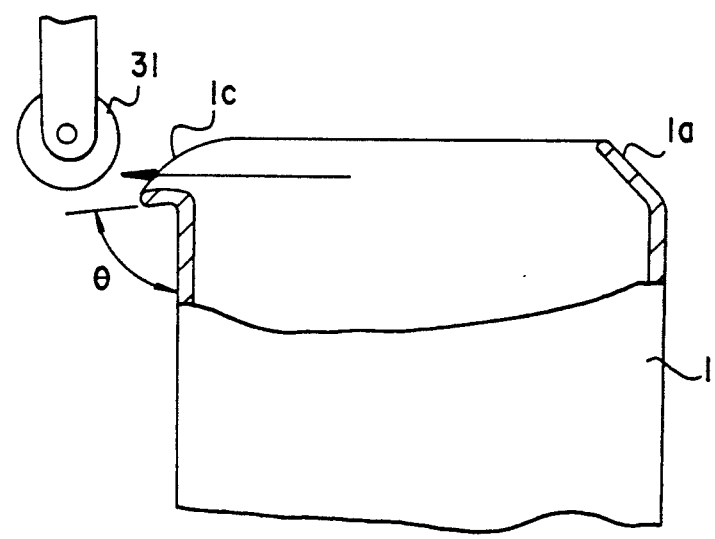

The glass container 1 premolded at the sixth position $P_6$ in the manner described above is transferred to the seventh position $P_7$, where it is subjected to the finishmolding of the spout 1c. The spout molding device 30 at the seventh position $P_7$ comprises a molding roller 31 as shown in FIG. 5A, and a driving mechanism 32 for moving it vertically and back and forth in the X direction. When the premolded glass container 1 is carried in at the seventh position $P_7$, the molding roller 31 is lowered to the inside of the opening edge 1a of the glass container 1 (FIG. 5A) and then advanced in the X direction as shown in FIG. 5B, pushing out the premolded softened portion 1b of the opening edge 1a to form a spout 1c. The forming angle $\theta$ of the spout 1c can be adjusted by changing the advance angle in the X direction and the advance direction of the molding roller 31. The molding of this spout can always be satisfactorily performed since it is performed after the softened portion 1b, which is the portion of the glass container, which is to be molded into a spout, has been performed to facilitate the molding of the spout 1c.

Figure 6:
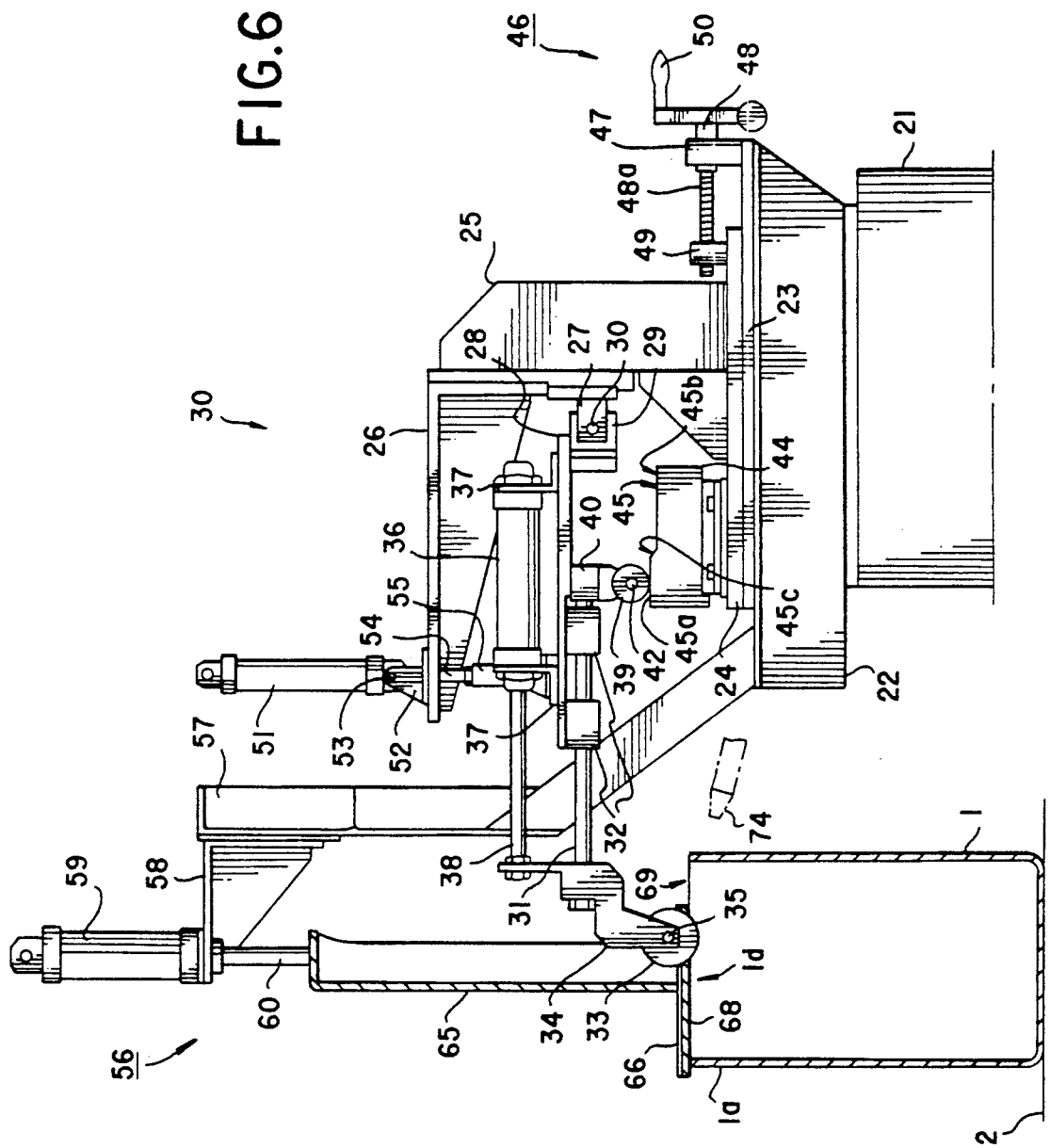
FIG. 6 is an elevational view, partly broken away, of a spout molding apparatus.
Figure 7A:
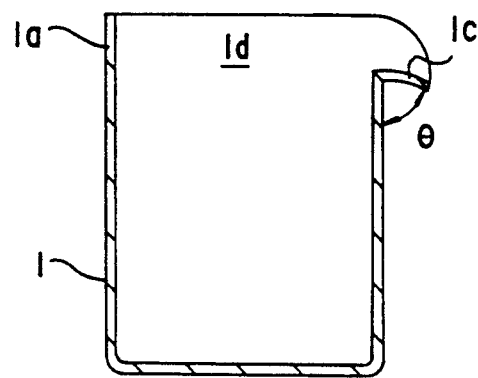
FIGS. 7A, 7B and 7C are longitudinal sectional views of glass containers having different spout forming angles.
Figure 7B:
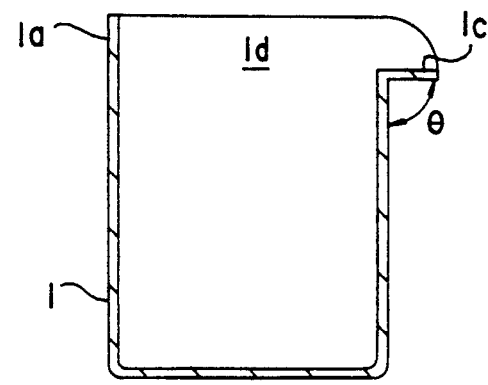
Figure 7C:
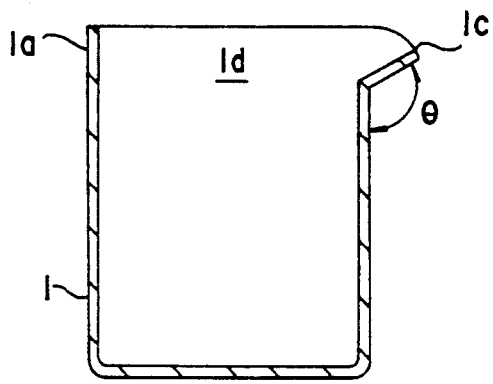

The detail of the spout molding device 30 is shown in FIG. 6. In addition, this spout molding device is used for fitting a mouth not only to a glass container having an inclined opening edge as shown in FIGS. 9A and 9B but also to ordinary glass containers as shown in FIGS. 7A through 7C. The reference numeral 21 denotes a lifting block 21 vertically movably installed, and an attaching base 22 is mounted on the upper surface of said lifting block 21. A glass container 1 is placed at a glass container setting position on a stage disposed forwardly of said attaching base 22. A guide rail 23 extending horizontally is installed on the attaching base 22, and a movable plate 24 adapted to move along the guide rail 23 is mounted on the guide rail 23. A first support frame 25 is erected on the rear region of the upper surface of the movable plate 24, and a second support frame 26 is fixed on the upper front surface of said first support frame 25 in such a manner that it projects forward. A substantially horizontal swing plate 28 has a pivot member 29 at its rear end, said pivot member being pivotally connected to an attaching bracket 27 fixed on the intermediate region of the front surface of the first support frame 25 through a pivot shaft 30, whereby it is swingable in a vertical plane. A guide rod 31 is horizontally movably held on the lower surface of the swing plate 28 by first guide members 32 to extend parallel with the swing plate 28. A bracket 34 of predetermined shape is attached to the front end of the guide rod 31, and a molding roller 33 in the form of an abacus bead is rotatably carried at the lower end of the attaching bracket 34 through a pivot shaft 35. An attaching member 40 is attached to the rear end of the guide rod 31, and a cam follower 39 is rotatably carried at the lower end of the attaching member 40 through a pivot shaft 42. An actuating cylinder 36 is mounted on the swing plate 28 through brackets 37, the front end of the rod 38 of said actuating cylinder 36 being joined to the upper end of the attaching bracket 34. The molding roller 33 is horizontally moved with the advance and retraction movements of the rod 38 of the actuating cylinder 36, pressing the upper opening edge 1a of the glass container 1 from the inside to the outside during the retraction movement, thereby forming the spout 1c at the upper end opening edge 1a.

A fixed cam 44 for setting a desired path of rearward movement of the molding roller 33 is installed on the front region of the upper surface of the movable plate 24 below the swing plate 28, the upper surface of said fixed cam being formed with a cam surface of desired shape for supporting the molding roller 33 to vertically guide it as the cam follower 39 is horizontally moved, for example, a cam surface 45, as shown, comprising an upper horizontal cam surface portion 45a in the front, a lower horizontal cam surface portion 45b in the rear, and an inclined cam surface portion 45c interconnecting said cam surface portions 45a and 45b. By suitably changing the shape of the cam surface 45 of the fixed cam 44, the path of movement of the molding roller 33 from the front to the rear can be changed so as to mold the spout 1c to a desired shape, said spout being formed at the upper opening edge 1a of the glass container 1.

The adjusting means 46 for adjusting the horizontal position of the molding roller 33 by moving the movable plate 24 back and forth comprises a fixed bracket 47 fixed on the upper surface of the rear end edge of the attaching base 22, an adjusting shaft 48 having a threaded portion 48a and rotatably supported in said fixed bracket, said threaded portion 48a of said adjusting shaft 48 being threadedly passed through an adjusting bracket 49 fixed on the upper surface of the rear end edge of the movable plate 24, and a handle 50 attached to the rear end of the adjusting shaft 48. Thus, when the handle 50 is turned, the resulting rotation of the adjusting shaft pushes or pulls the adjusting bracket 49, moving the movable plate forward or backward.

An advancing and retracting cylinder 51 comprising an air cylinder for advancing and retracting the molding roller 33 in the direction of the height is pivotally connected in the inverted state for swing movement to an attaching bracket 52 fixed on the upper surface of the front end of the second support frame 26 through a pivot shaft 53, the advancing and retracting rod 54 thereof projecting downward through the second support frame 26 and connected at its front end to the front edge of the upper surface of the swing plate 28 through a fixed member 55. The advance and retraction movements of the advancing and retracting rod 54 of the advancing and retracting cylinder 51 cause the swing plate 28 to swing in a vertical plane around the axis of the pivot shaft 30, moving the molding roller 33 between the position for molding the lower portion of the spout of the glass container and the upper refuge position. When the molding roller 33 is moved rearward in the lower portion molding position, the cam follower 39 is always pressed against the cam surface 45 of the fixed cam 44 so that it rolls on said cam surface 45.

Figure 8:
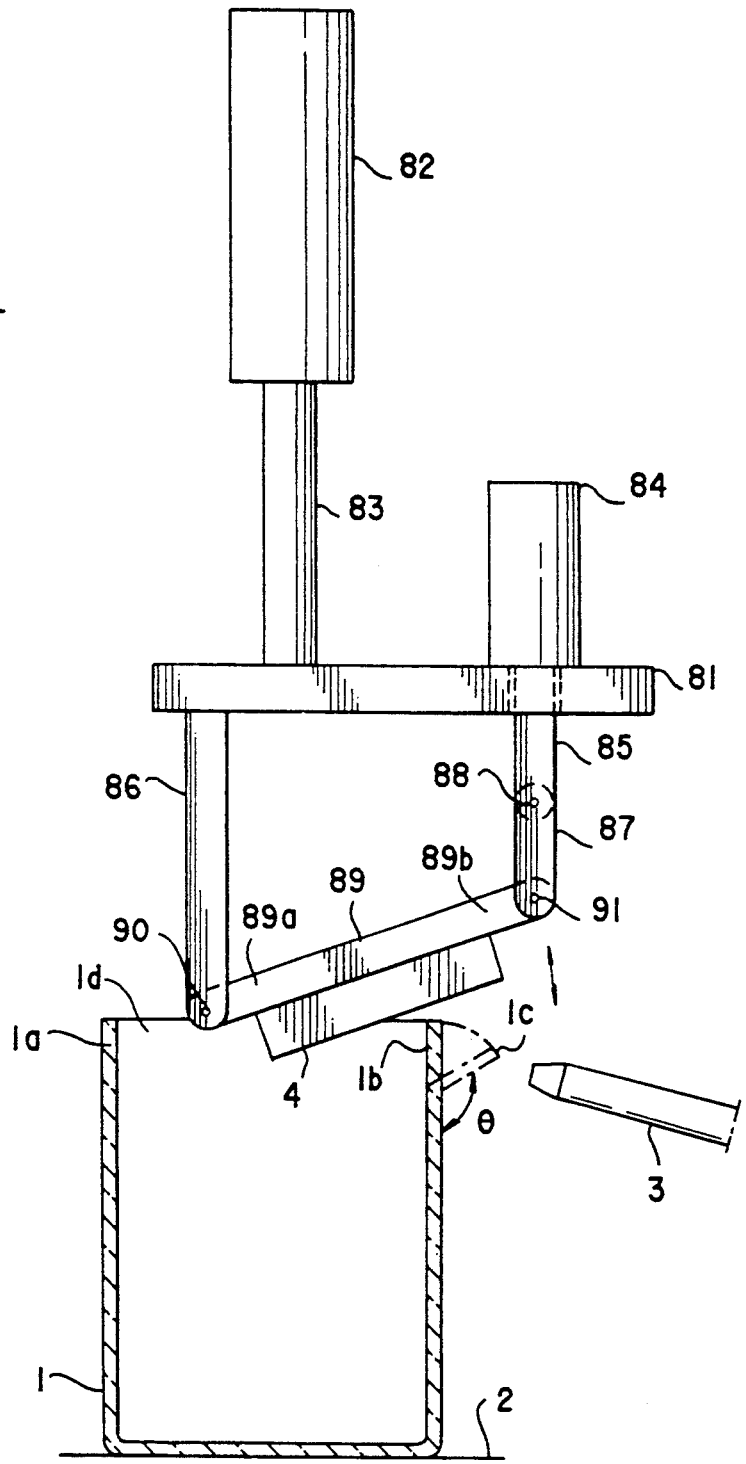
FIG. 8 is a schematic view of a conventional spout molding apparatus.

Fixing means 56 comprises a presser plate 66 attached to the pressing rod 60 of a pressing cylinder 59 through an attaching frame 65. The pressing cylinder 59 is attached to the upper end of a pillar 57 erected on the attaching base 22 through a bracket 58. The pressing cylinder 59 serves to vertically move the presser plate 66 through the presser rod 60 and attaching frame 65, on the glass container 1 positioned at the glass container setting position on the stage 2. The presser plate 66 is substantially in a crescent form with the middle portion removed, the lower surface thereof having a rubber pad 68 applied thereto. At the end of the forward movement, the molding roller is positioned in a notch 69 in the presser plate 66, thereby avoiding interference with the presser plate 66. A burner 74 serves to heat the predetermined region of the upper opening edge 1a of the glass container 1 and corresponds to the burner 3 shown in FIG. 8.

The operation of this spout molding device 30 will now be described. In addition, it is premised that the molding roller 33 is in the refuge position at the advance end and that the presser plate 66 is positioned at the lifted end. When the glass container is placed at the glass container setting position on the stage 2, the pressing rod 60 of the pressing cylinder 59 and the advancing and retracting rod 54 of the advancing and retracting cylinder 51 are projected, so that the upper opening edge 1a of the glass container 1 is pressed by the presser plate 66 and the glass container 1 is fixed on the stage 2. Further, the swing plate 28 is turned downward around the axis of the pivot shaft 30, and the cam follower 39 at the rear end of the guide rod 31 abuts against the upper horizontal cam surface portion 45a on the front side of the fixed cam 44, while the molding roller 33 is positioned at the notch 69 of the presser plate 66 in the molding position and held in the upper opening 1d in the glass container 1. Thereafter, when the actuating rod 38 of the actuating cylinder 36 is projected, since the cam follower 39 is always pressed against the cam surface 45 of the fixed cam 44, it is moved rearward as guided by the upper horizontal cam surface portion 45a, inclined cam portion 45c and lower horizontal cam surface portion 45b of the fixed cam 44. The retraction of the cam follower 39 causes the swing plate 28 to swing around the axis of the pivot shaft 30, so that the molding roller 33 retracts substantially horizontally while describing the same path as the shape of the cam surface 45 of the fixed cam 44. On the retracting way of the molding roller 33, the predetermined portion of the upper opening edge 1a of the glass container 1 heated by the burner 74 is radially outward substantially horizontally by the molding roller 7, thereby forming a beak-like spout 1c whose forming angle θ is acute, as shown in FIG. 7A. When the spout 1c is formed in the upper opening edge 1c of the glass container 1 in this manner, the pressing rod 60 of the pressing cylinder 59 and the advancing and retracting rod 54 of the advancing and retracting cylinder 51 are retracted and the presser plate 66 is positioned at the lifting end while the molding roller 33 is positioned in the refuge position at the retracted end, with the cam followers 39 spaced away from the cam surface 45 of the fixed cam 44. Then, after the glass container 1 with its spout 1c completed has been passed to the next step, a glass container 1 with its spout not completed is transferred onto the stage 2. Thereupon, the actuating rod 38 of the actuating cylinder 36 is projected and the molding roller 33 is advanced and held in the refuge position at the advance end. Thenceforth, the spout molding operation is performed in the same manner as described above.

In the above embodiment, in the case where the height of the glass container 1 is changed, the lifting block 21 is lifted or lowered to adjust the height position of the molding roller 33. Further, in the case where the diameter of the glass container 1 is changed, the handle 50 is turned to move the movable plate 24 to adjust the radial position of the molding roller 33.

Further, the shape of the cam surface 45 of the fixed cam 44 is not limited to the above embodiment, and various shapes may be used for the cam surface 45. Since the path of movement of the molding roller 33 is set by the shape of the cam surface 45 of the fixed cam 44, changing the shape of the cam surface 45 will change the path of movement of the molding roller 33, making it possible to mold a spout of any desired shape in the glass container 1. Therefore, besides the spouts shown in FIGS. 7A and 7B, a spout as shown in FIG. 7C can, of course, be molded.

What is claimed is:

1. A method of fitting a spout to a glass container, having an inwardly inclined upper opening edge, comprising the steps of heating an inwardly directed portion of the upper opening edge of said container to soften it, raising said heated softened portion of said inwardly inclined upper opening edge from an inwardly directed position at the inside of the glass container, outwardly directing said raised heat softened portion, and molding such into an externally directed spout.

2. An apparatus for fitting a spout to a glass container, having an outer circumferential wall and an inclined upper opening edge extending inwardly from said wall, said apparatus comprising means for heating an inwardly directed portion of said inwardly extended upper molding edge which is to be molded into said spout to soften it, means for raising said heated softened portion from an inwardly directed position inclined toward the inside of the glass container to a position substantially coplanar with a corresponding portion of said wall, means to heat said coplanar portion and means to form an outwardly directed spout in said heated coplanar portion.

3. An apparatus for fitting a spout to a glass container as set forth in claim 2, wherein said means to form said outwardly directed spout comprises a molding member, supported on a support frame above said glass container, means to move said means for forming said spout in vertical and horizontal directions, actuating cylinder means adapted to move said spout forming means substantially horizontally, and fixed cam means adapted to vertically guide or control said molding member during movement by said actuating cylinder.

* * * * *